(12) United States Patent
Liew

(10) Patent No.: US 7,198,246 B2
(45) Date of Patent: Apr. 3, 2007

(54) METHOD OF STRENGTHENING OF MOULDS OF ALUMINUM OR ITS ALLOY

(76) Inventor: Khong Fah Liew, No. 1, Jalan Desa Ria, Taman Desa, Jalan Klang Lama, Kuala Lumpur (MY) 58100

( * ) Notice: Subject to any disclaimer, the term of this patent is extended or adjusted under 35 U.S.C. 154(b) by 343 days.

(21) Appl. No.: 10/849,894

(22) Filed: May 21, 2004

(65) Prior Publication Data

US 2004/0253341 A1    Dec. 16, 2004

(30) Foreign Application Priority Data

Jun. 11, 2003   (MY) .............................. PI 20032179

(51) Int. Cl.
*B29C 33/00* (2006.01)
(52) U.S. Cl. ..................... 249/135; 425/190; 29/428
(58) Field of Classification Search ............... 249/102, 249/135; 425/190, 191, 193; 29/428, 527.5
See application file for complete search history.

(56) References Cited

U.S. PATENT DOCUMENTS 5,762,981 A *   6/1998   Nitsche ..................... 425/522
6,595,379 B1 *  7/2003   Powell ...................... 211/192
6,871,830 B2 *  3/2005   Covino ...................... 249/135

OTHER PUBLICATIONS

Rosato et al., Injection Molding Handbook 3 ed., 2000, Kluwer Academic Publishers, p. 345.*

* cited by examiner

*Primary Examiner*—Donald Heckenberg
(74) *Attorney, Agent, or Firm*—Bacon & Thomas, PLLC

(57) ABSTRACT

The invention relates to a method of strengthening a mould manufactured from aluminium or its alloys. One method of strengthening a mould having mould body and mould walls as an integral unit is to include at least one insert into each of the mould walls. These inserts are of stronger material or materials as compared to the mould material. Each of these inserts is of the same height as that of the mould wall at the position where it is located. Another method uses reinforced walls which are separate units, with the reinforced walls made of a higher strength material or materials than that of the mould body. The reinforced walls are coupled to the mould body either by fasteners or by welding or bonding or by any other suitable means. The invention also relates to moulds including strengthening according to one or more of these methods.

10 Claims, 7 Drawing Sheets

METHOD OF STRENGTHENING OF MOULDS OF ALUMINUM OR ITS ALLOY

BACKGROUND OF INVENTION

Moulds made from aluminium its alloys are in common use in the rubber moulding industry. These moulds have several advantages. They are easy to cast and machine and moulds with intricate patterns in their cavities can be cast or machined with little difficulties. In addition moulds made from aluminium or its alloys are relatively lighter as they have lower material densities. This facilitates their handling, reducing mould changing times and easing other related activities. Aluminium and its alloy are not expensive raw materials and with the above mentioned benefits moulds made from them are relatively cheaper overall as compared with moulds made from other materials. However aluminium or its alloy as mould material is not without disadvantages. Aluminium and its alloy are in general softer as compared to steel or cast iron. Being softer, deformations of the mould walls and to a lesser extent the mould body and the mould cavity can happen with repeated usage, all of which lead to some extend changes in dimensional properties of the moulded products. Due to their relative softness there are limits to the moulding pressures with moulds made from aluminium or its alloy.

It is under the above circumstances that the present invention introduces a method of strengthening a mould of aluminium or its alloy as the base material in order to extend its service life.

SUMMARY OF THE INVENTION

The present invention relates to a method of strengthening a mould made of aluminium or its alloy and moulds make thereof with the disclosed method. The mould has a mould body, with a backing and a cavity and extending from the edges of the mould body and away from the backing are the mould walls. The backing of the mould body and the lower surfaces of the mould walls are at the same level and together form the mould backing face. The heights of the mould walls are dependent on the dimensional thickness of the component to be moulded. The mould is fastened to the moulding press with its backing face in contact with the lower platen. The mould cavity incorporates the desired patterns on its face which imprint on to the blank or moulding compound to form the product in the moulding process. The upper surfaces of the mould walls come in contact with the upper platen in the moulding process. Moulding pressures exist at the surfaces of contact of the mould and the upper platen in the moulding process. With repeated usage the contact surfaces of the mould walls get worn and deformed to a certain extent. In due course the wear and deformation reach a level whereby the dimensional tolerances of the moulded product reach their limits. Subsequent usage of the mould will only result in an increase in the number of rejected moulded items.

Various methods are introduced in the present invention to prevent the deformation and wear of the mould walls and hence extend the service life of the mould in general. One method includes introducing an insert or a plurality of inserts in each of the mould walls to react majority of the moulding pressures encountered in the moulding process. These inserts are made of a material or materials that is stronger than the base material of the mould. The inserts can either be cast into the mould walls or pressed into pre-drilled through holes in the mould walls and then held in position by interference or screwed into pre-tapped through holed in the mould walls or introduced into the mould walls by any other suitable mean. Each of these inserts is of the same height as that of the mould wall at the position where it is located.

Another method is to couple reinforced walls to the mould body. The reinforced walls are made of a material or materials of higher strength as compared to the material of the mould body. The reinforced walls can then be coupled to the mould body either by fasteners or by welding or by bonding or by any other suitable means.

These and other features, advantages, and objects of the present invention will be further understood and appreciated by those skilled in the art by reference to the following specification, claims and appended drawings.

BRIEF DESCRIPTION OF THE DRAWINGS

Shown in FIG. 1 is an isometric view of a mould with inserts cast into the mould walls.

Shown in FIG. 1A is the rear view of the mould of FIG. 1 showing its backing face.

Figure 1:
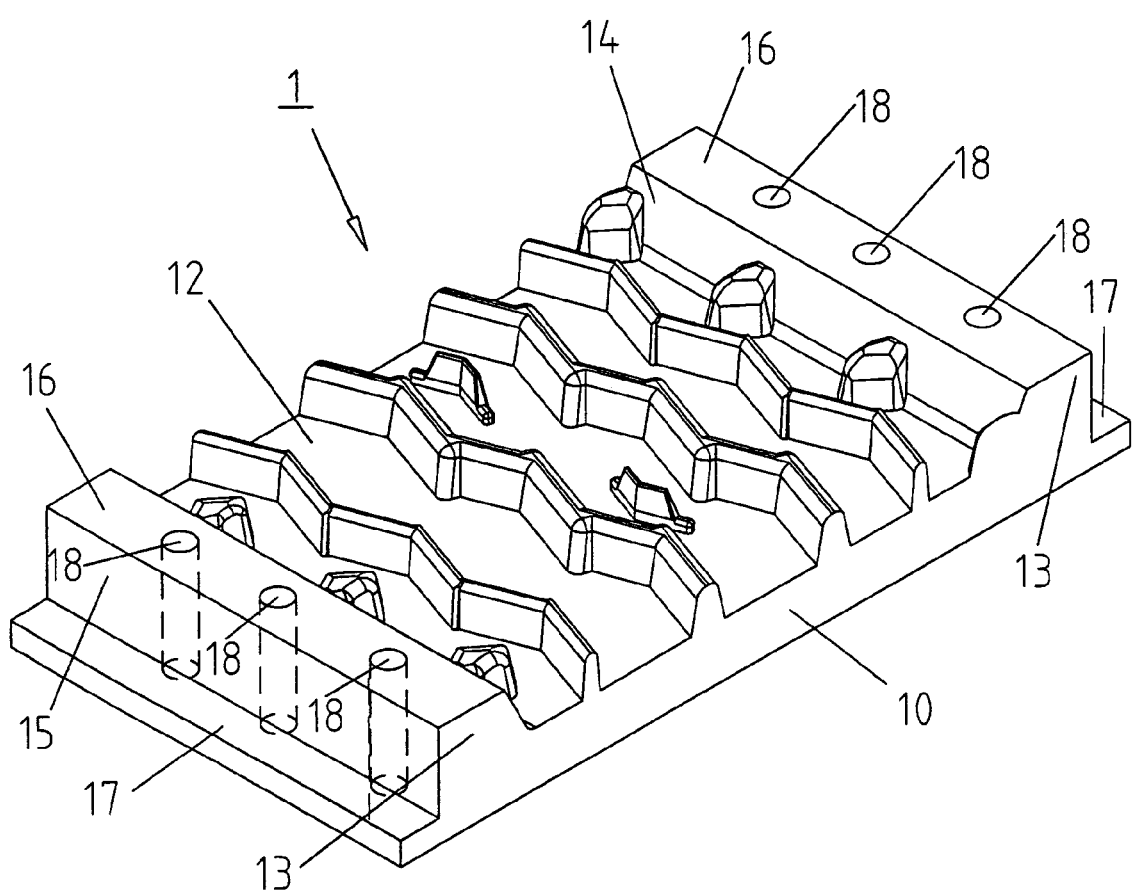
Figure 1A:
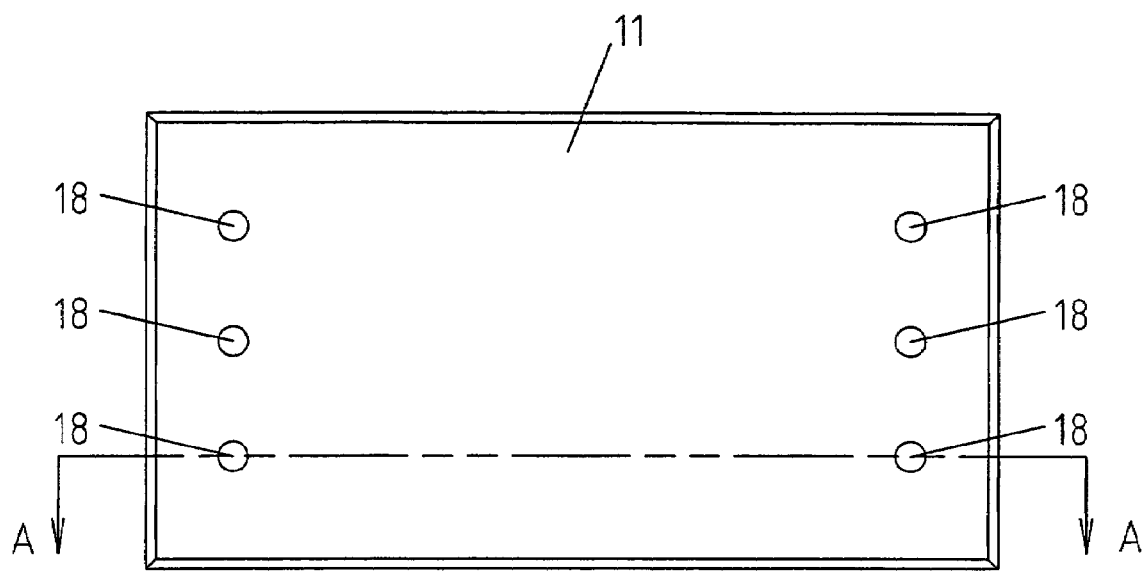
Figure 1B:
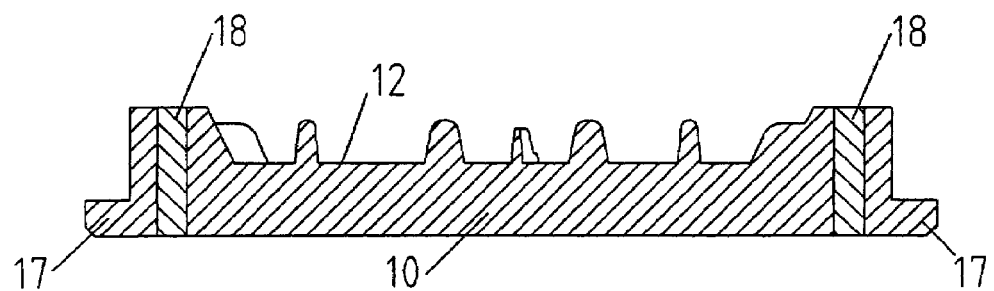

Shown in FIG. 1B is the sectional view through 'AA' of the mould shown in FIG. 1A.

Figure 2:
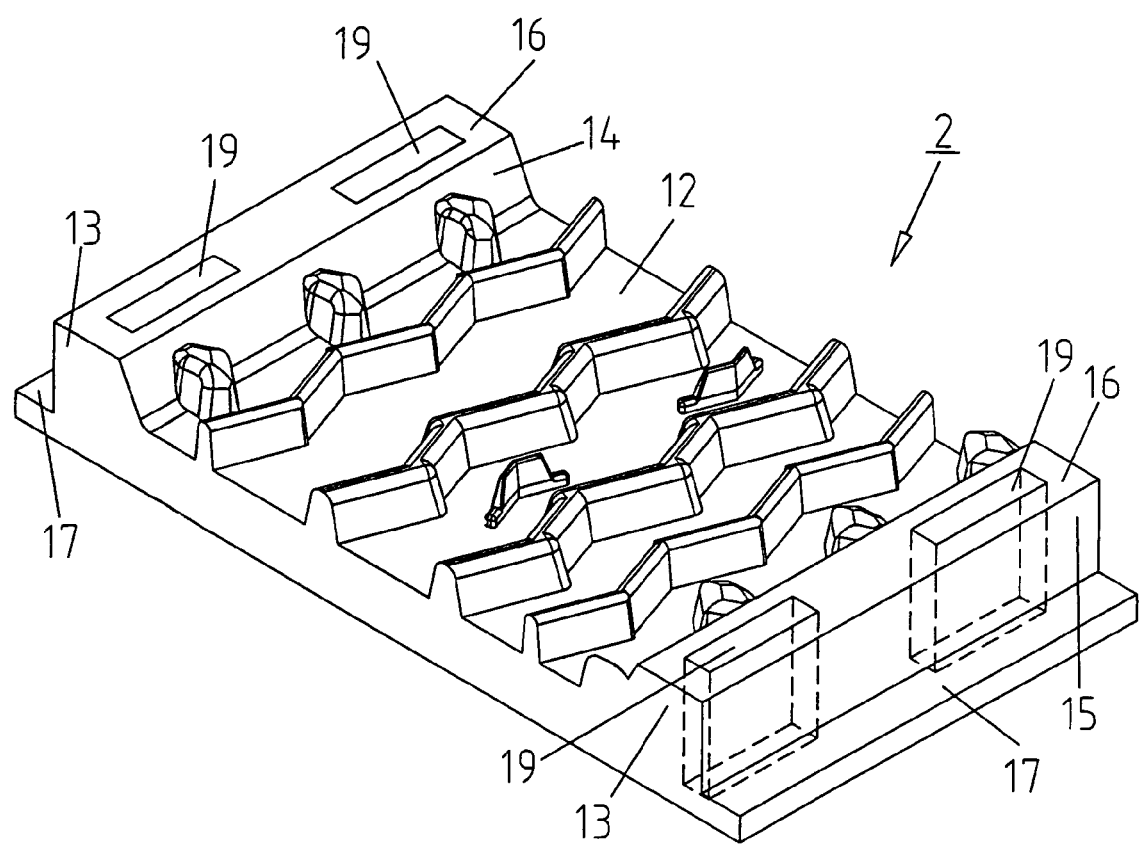

Shown in FIG. 2 is an isometric view of a mould where the inserts of another form are cast into the mould walls.

Figure 3:
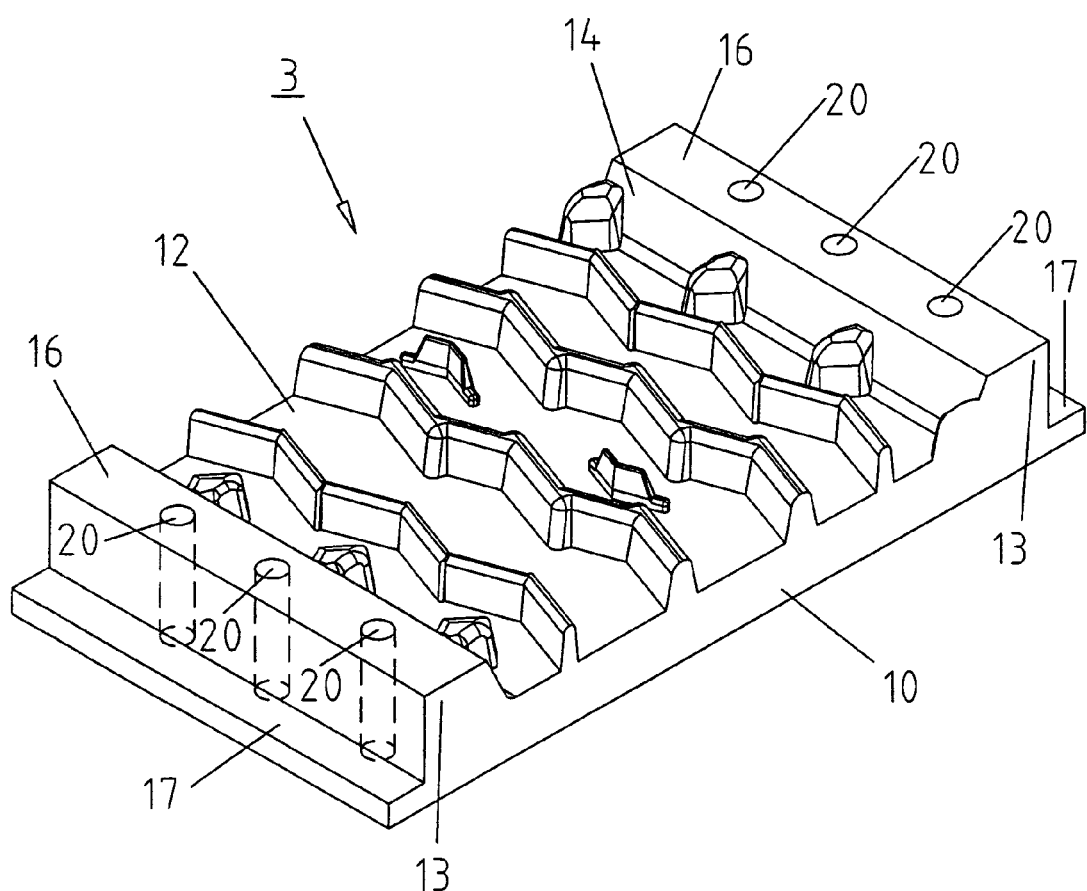

Shown in FIG. 3 is an isometric view of a mould where the inserts are shrink fitted into through holes in the mould walls.

Figure 4:
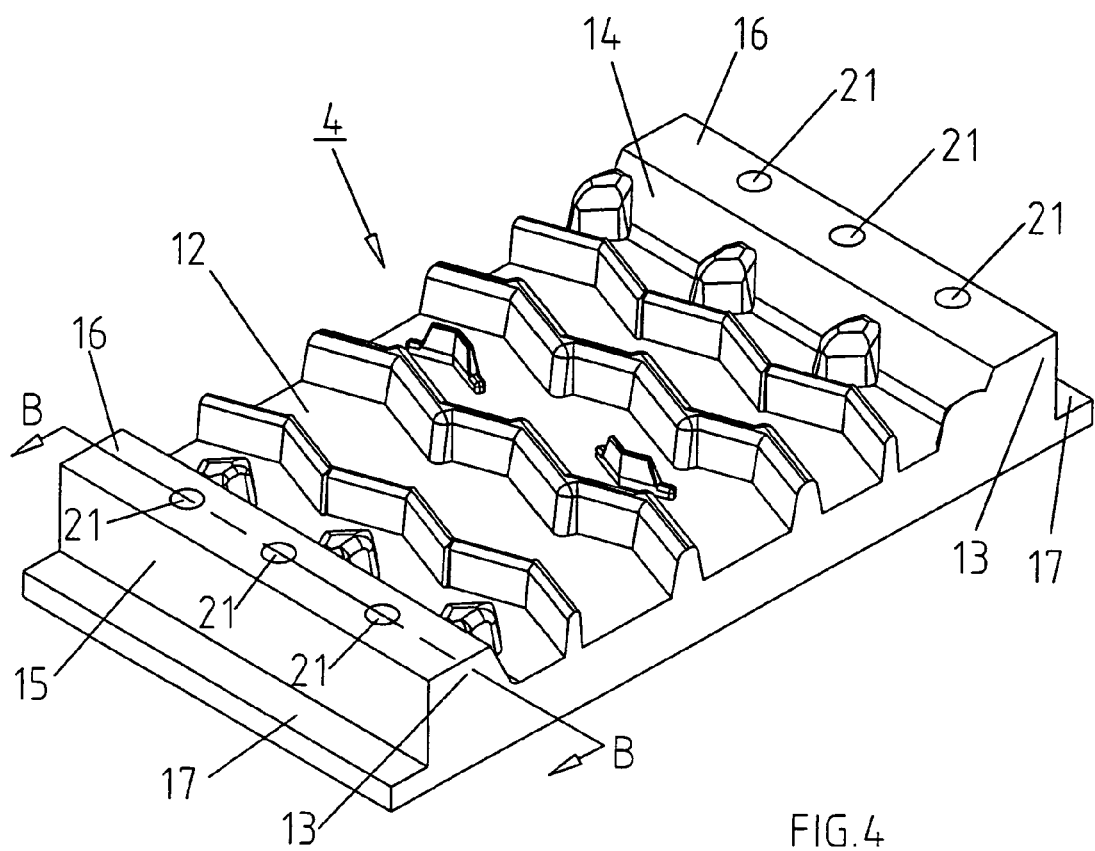

Shown in FIG. 4 is an isometric view of a mould where inserts are fastened into tapped through holes in the mould walls.

Figure 4A:
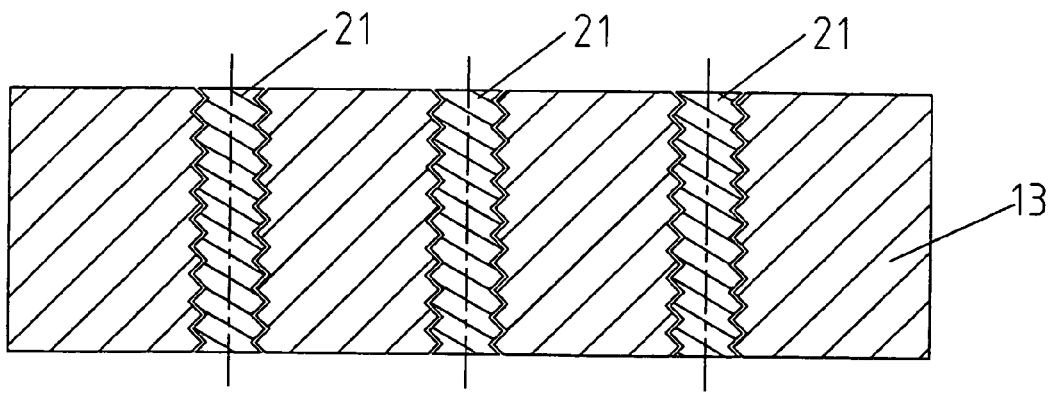

Shown in FIG. 4A is the sectional view through 'BB' of FIG. 4.

Figure 5:
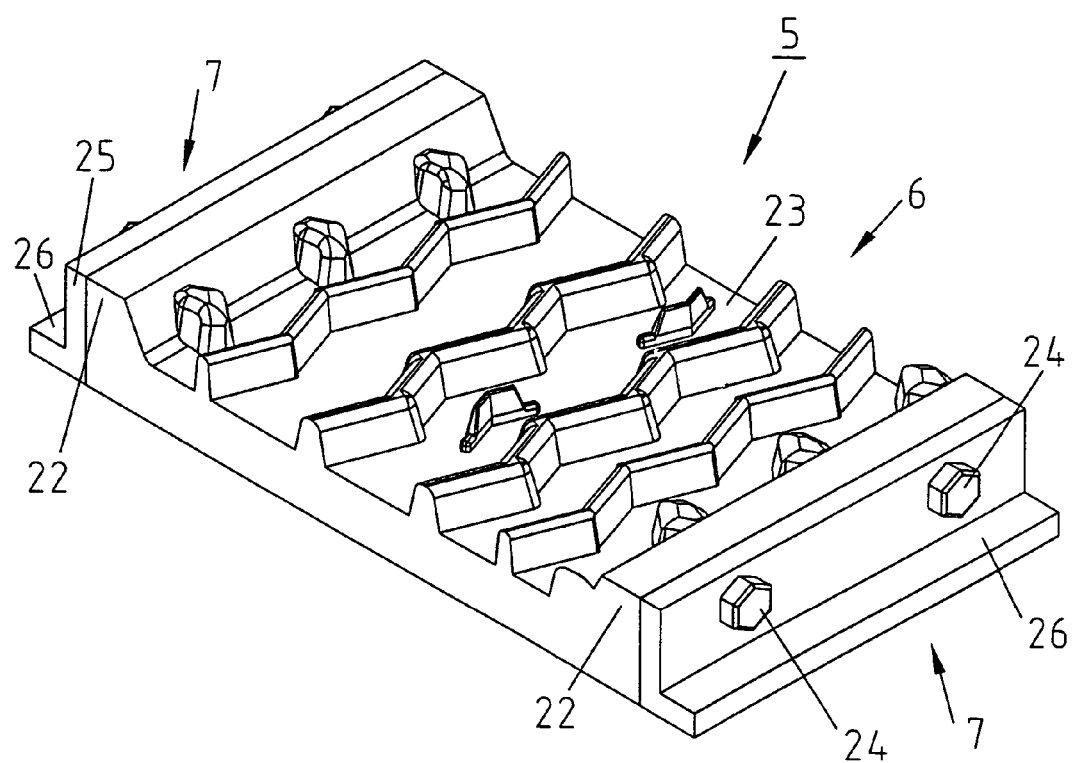

Shown in FIG. 5 is an isometric view whereby the mould body and the reinforced walls are separate items with the reinforced walls of a higher strength material as compared to the material of the mould body. The reinforced walls are attached to the mould body by fasteners.

Figure 6:
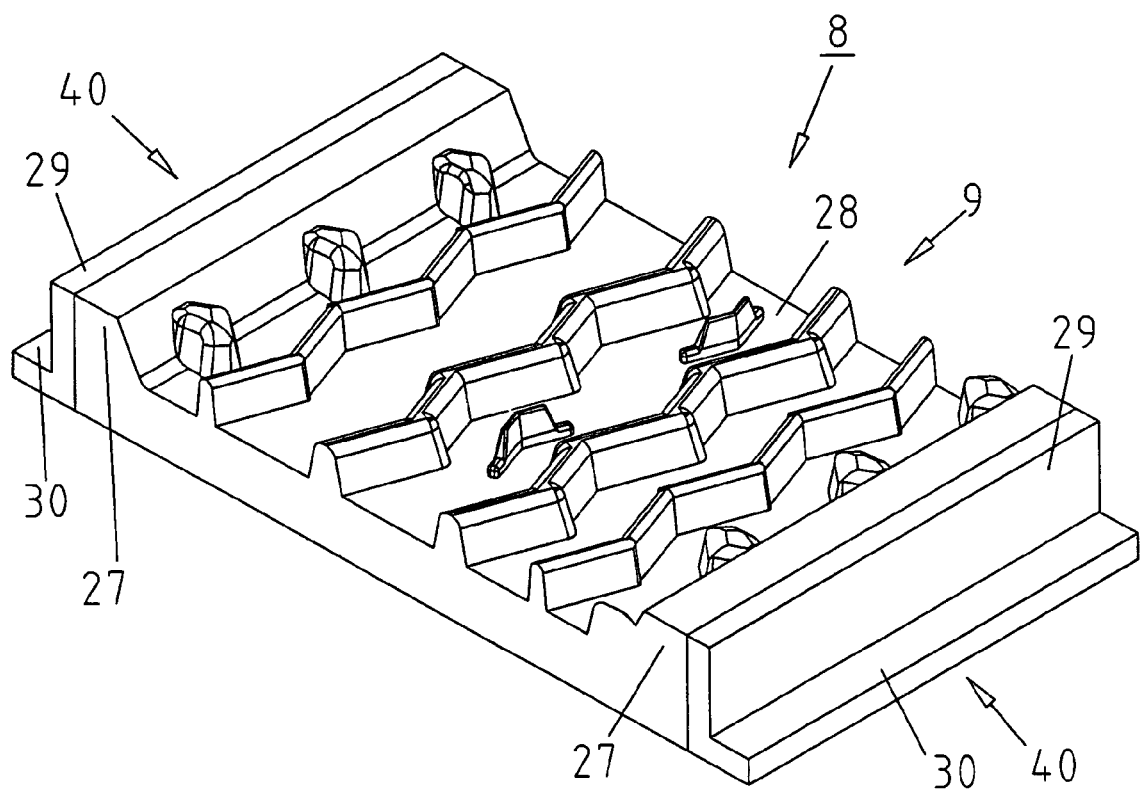

Shown in FIG. 6 is an isometric view whereby the mould body and the reinforced walls are separate items with the reinforced walls of a higher strength material as compared to the material of the mould body. The reinforced walls are either welded, bonded or attached to the mould body by any suitable mean.

DETAIL DESCRIPTION OF PREFERRED EMBODIMENTS

Shown in FIG. 1 is a mould (1) whereby there is a mould body (10) with a backing and a mould cavity (12). Extend from edges of the mould body (10) and away from the backing are the mould walls (13) each with an inner face (14), an outer face (15) and a contact surface (16). In this example two mould walls (13) are present and are located at two opposite edges of the mould body (10). The mould body (10) and the mould walls (13) in this case form an integral unit. Along the outer face (15) of each of the mould walls (13) and at the lower region is a flange (17) that extends along the whole length of the mould wall. The lower faces of the flanges (17) are at the same level as the mould's backing and together form the backing face (11) of the mould as shown in FIG. 1 and FIG. 1A. The purpose of flanges (17) is for locating and fastening the mould to the moulding machine. The mould is attached to the lower platen of the moulding press whereby backing face (11) of the mould is in contact. The mould walls (13) provide height separations and their heights are dictated by the dimensional requirements of the product to be moulded. In the moulding process the blank or moulding compound is placed in the mould cavity (12) and between the mould walls (13). The lower platen of the moulding press then raises till the contact surfaces (16) of the mould walls (13) reach and press against the upper platen. There exist certain contact pressures at the contact surfaces (16) of the mould walls (13). The values of the pressures are dependent on the material to be moulded and the moulding process adopted. In addition the mould is usually subjected to an elevated temperature during operation. With repeated usage the mould walls (13) will wear and distort especially at their contact surfaces (16).

One of the methods of the present invention to mitigate the distortion of the mould walls (13) in the moulding process is to include at least one insert in each of the mould walls (13). The inserts are made from a material or materials of higher strength than the base material of the mould that in this case is aluminium or its alloy.

Each of the inserts is also of a height substantially identical to that of the mould wall at the position where it is located. In other words the upper face of the insert is exposed and flush with the immediate surrounding contact surface (16) of the mould wall and the lower face of the insert is exposed and flush with the immediate surrounding backing face (11) of the mould. These inserts act as 'pillars' to react the majority of the moulding forces encountered in the moulding process.

In a preferred embodiment as shown in FIG. 1 of mould (1) a plurality of inserts (18) are positioned securely at strategic locations of the intended mould walls before the mould is cast. After the mould has been cast the inserts (18) are set in their prescribed positions. In the example shown in FIG. 1 of mould (1) the inserts (18) are cylindrical in shape with circular cross sections. In another example shown in FIG. 2 of mould (2) the inserts (19) are of rectangular cross section. The plurality of inserts can be of different shapes and cross sections and not limited by the two examples above.

In yet another embodiment as shown in FIG. 3 a plurality of inserts (20) are introduced after the mould (3) has been cast. In this case vertical holes are drilled at strategic positions through the mould walls (13). Oversized inserts (20) are then pressed into these holes and held in position by interference. As in the previous example each of the inserts (20) is of a height identical to that of the mould wall at the position where it is located. Difference in the thermal expansions of the inserts (20) and the base mould material and the operating temperatures of the mould are taken into account in determining the interference between the inserts and the drilled holes in the mould walls.

In yet another embodiment, shown in FIG. 4 a plurality of inserts (21) is introduced after the mould (4) has been cast. In this case vertical holes are drilled at strategic positions through the mould walls (13). These holes are then tapped and threaded. Threaded inserts (21) are then screw into these holes. As in the previous examples each of the inserts (21) is of a height substantially identical to that of the mould wall at the position where it is located.

In yet another embodiment as shown in FIG. 5 the mould (5) is made of multiple units. There is a mould body (6) consisting of a backing, a mould cavity (23) and side walls (22) which together form a unit made of aluminium or its alloy. Reinforced walls (7) made of a material or materials of higher strength as compared with the material of the mould body (6) form the other units. In this example two reinforced walls (7) are present and are located at two opposite edges of the mould body (6). The height of each of the reinforced walls (7) is equal to or greater then that of the adjacent side wall (22) of the mould body (6). Each reinforced wall (7) has a 'L' shaped cross section; a vertical section (25) and a horizontal section forming a flange (26). The outer face of the vertical section (25) of each reinforced wall (7) rests next to the outer face of an adjacent side wall (22) of the mould body 6. Each reinforced wall (7) is then securely attached to the adjacent side wall (22) of the mould body (6) by fasteners (24) at the side as shown in FIG. 5. The lower faces of flanges (26) are at the same level as the backing of the mould body and together form the backing face of the overall mould; the backing face rests on the lower platen of the moulding machine. The mould (5) is then located and fastened to the moulding machine at the flanges (26) of the reinforced walls (7). The reinforced walls (7) of the mould (5) help to react the high moulding pressures encountered in the moulding process.

In yet another embodiment, the mould (8), as shown in FIG. 6 has a mould body (9) and reinforced walls (40) and is similar in many ways to mould (5) shown in FIG. 5. The reinforced walls (40) are made of a material or materials stronger then the material of the mould body (9). However for mould (8) the reinforced walls (40) are attached to the mould body (9) by either welding or bonding or by any other suitable mean.

The foregoing is considered as illustrations of the principles of the invention. Further more, since numerous modifications and changes will readily occur to those skilled in the art, it is not desired to limit the invention to the exact construction and operation shown and described, and accordingly all suitable modifications and equivalents may be resorted to, falling within the scope of the invention.

The invention claimed is:

1. A method of strengthening the mould walls in order to extend the service life of a mould, made from aluminium or its alloys, having a mould body with a backing and a mould cavity, surrounding mould walls; the mould body and the mould walls form an integral unit, wherein the method consists:

including at least one insert in each of the mould walls;

whereof each of the inserts is of substantially the same height as the mould wall at the position where it is located; and the inserts are of a different and stronger material or materials as compared to the mould base material.

2. A method as in claim 1 wherein at least one insert is cast into each of the mould walls.

3. A method as in claim 1 wherein at least one insert is pressed into through holes made in each of the mould walls after the mould has been cast and with the inserts held in position by interference fit.

4. A method as in claim 1 wherein at least one insert is threaded into tapped through holes in each of the mould walls.

5. A method of strengthening a mould, made from aluminium or its alloys, having a mould body with a backing, a mould cavity and mould walls forming a unit, wherein the method consists in the provision of reinforced walls, forming separate units, made of a stronger material or materials as compared to that of the mould body; and the height of any of the reinforced walls is substantially the same as or higher than the adjacent mould wall to which it is attached.

6. A method as in claim 5 wherein the reinforced walls are attached to the mould body at the mould walls by fasteners.

7. A method as in claim 5 wherein the reinforced walls are attached to the mould body at the mould walls by welding.

8. A method as in claim 5 wherein the reinforced walls are attached to the mould body at the mould walls by bonding or any other suitable mean.

9. A mould made of a base material comprising aluminium or its alloys; the mould having a mould body with a backing and a mould cavity, surrounded more than one mould wall and the mould cavity and the mould walls form an integral unit, wherein at least one of the mould walls includes at least one insert within the wall, the insert having substantially the same height as the mould wall at the position where it is located, and the or each insert being comprised of a different and stronger material or materials as compared to the base material.

10. A mould made of base material comprising aluminium or its alloys; the mould having a mould body with a backing and a mould cavity, surrounded by more than one mould walls and the mould cavity and the mould walls form an integral unit; each mould wall having a cavity side and an outside, wherein at least one of the mould walls is provided with reinforcement means comprising at least one separate unit positioned on an outside of the mould wall, the reinforcement means being made of a stronger material or materials as compared to that of the mould body; the reinforcement means having a height at least substantially equal to that of the adjacent mould wall to which it is attached.

* * * * *